C. STENGEL.
MACHINES FOR FORMING DOVETAIL JOINTS IN WOODWORKING.
No. 183,030.  Patented Oct. 10, 1876.
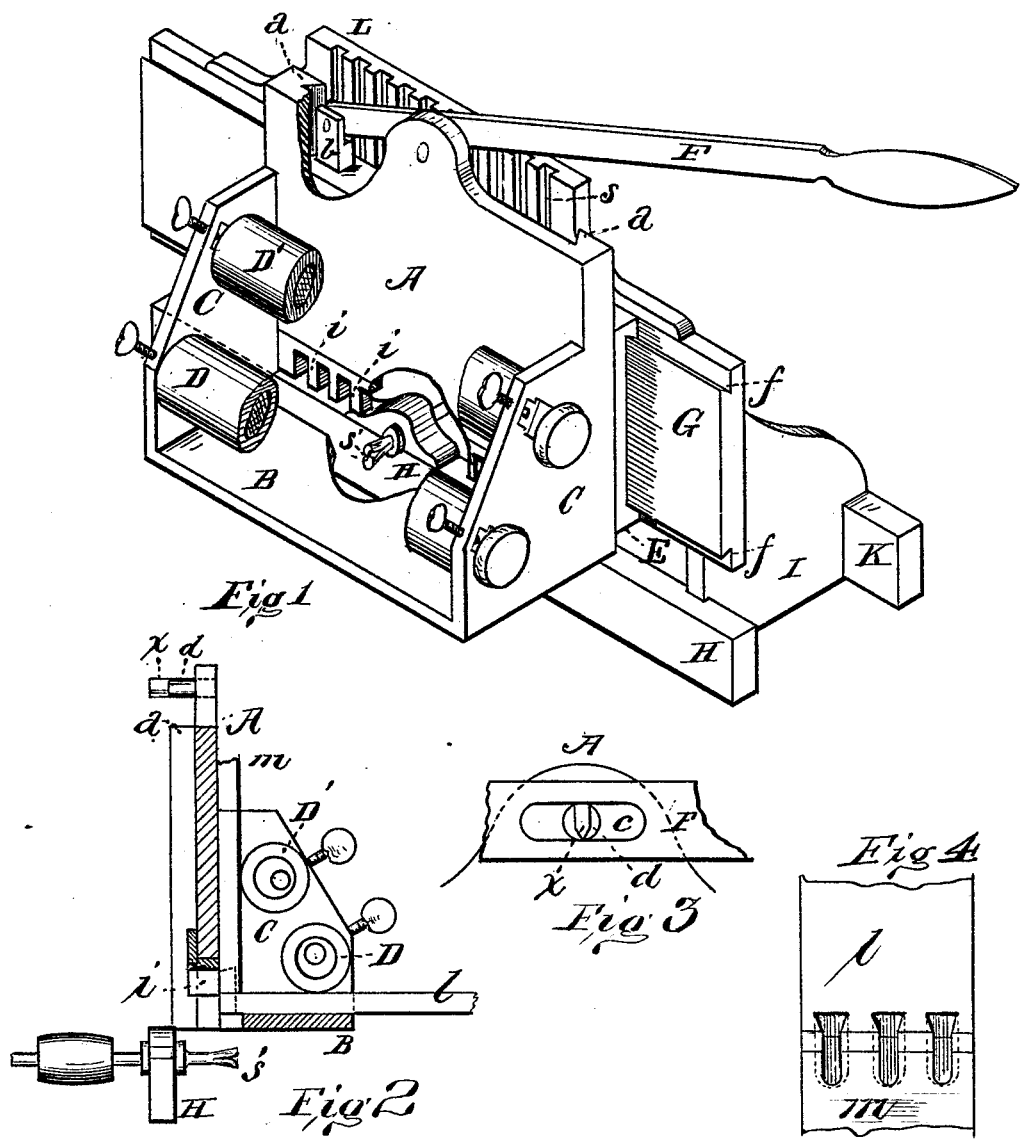

UNITED STATES PATENT OFFICE.

CHARLES STENGEL, OF HAMILTON, OHIO.

IMPROVEMENT IN MACHINES FOR FORMING DOVETAIL-JOINTS IN WOOD-WORKING.

Specification forming part of Letters Patent No. 183,030, dated October 10, 1876; application filed July 1, 1876.

*To all whom it may concern:*

Be it known that I, CHARLES STENGEL, of Hamilton, in the county of Butler and State of Ohio, have invented a new and useful Improvement in Machines for Forming Dovetail-Joints in Wood-Working; and I do hereby declare that the following is a full and exact description thereof, reference being had to the accompanying drawings, and to the letters of reference marked thereon.

Figure 1 is a perspective view of my improved machine, with portions of the carriage and rolls broken away to exhibit the location of the cutting-tool and the connection of the hand-lever with the horizontally-sliding plate. Fig. 2 is a transverse vertical section of the carriage with the lumber to be worked; also represents the cutting-tool in its relation to the carriage when ready for operation. Fig. 3 represents the rear side of a portion of the carriage and its connection with the hand-lever. Fig. 4 represents the lumber in a reversed position after the dovetails are formed, and before a change of the pieces of lumber in relation to each other has been made.

My invention relates to that class of dovetailing-machines which form the dovetails upon two pieces of lumber at the same operation by the use of a rotary cutter, to which the lumber is presented. I use a vertically and horizontally reciprocating carriage, in which the lumber is clamped; and the carriage is operated by manual power by the use of a single lever.

A B C denote the lumber-carriage, provided with two eccentric clamping-rolls having sleeves to prevent undue friction. The rolls D D' are journaled in sliding boxes, so that they may be adjusted and set to hold lumber of different thicknesses. The rear side of the carriage back A is provided with the V-shaped lips $a$ $a$, which work in correspondingly-formed recesses made upon the intermediate traveling plate E, to which stud $b$ is secured. Lever F, hinged to the stud $b$, has a slot, $c$, through which the pin $d$, attached to the carriage, projects, as represented in Fig. 3, and by means of which the carriage is moved vertically upon plate E. This intermediate traveling plate E, is saddled upon the vertical plate G, which is provided with longitudinal ways $f$ $f$. Plate G is secured to a table or frame, H I K, in which a horizontal tool-shaft is journaled. Upon the upper edge of plate G a vertically-grooved plate, L, is fastened, and the projecting wedge-pointed end $x$ of pin $d$ is shaped to enter and fit the grooves $s$ of plate L, and to gage the work of forming the dovetails. The lower edge of the carriage has a comb attached to it, and the spaces between the teeth $i$ of the comb are sufficient to admit the shank of the tool $s'$. The object of the teeth $i$ is to serve as a stop to prevent the end of the lower piece $l$ of the lumber from being thrust too far into the carriage, and to determine its position in relation to the carriage and to the piece $m$ of lumber, which will be clamped against the part A. The two pieces of lumber $l$ $m$ are secured by rolls D D' at right angles to each other, as represented, when the attendant will commence the work by raising the carriage by the hand-lever F, the slot $c$ working upon pin $d$, and when the carriage is elevated to the position as represented in Fig. 2, the attendant will adjust it laterally so as to cause the wedge-shaped guide $x$ to enter the first groove $s$ of the series in plate L; and as the carriage is forced downward the lumber will be brought in contact with the rotating cutter, (which is of the proper shape to form the dovetails,) and as the carriage descends a portion of the ends of the pieces of lumber $l$ $m$ will be cut away by tool $s'$, as represented in Fig. 4, in which the two pieces $l$ $m$ are shown as in a reversed position from that occupied in the carriage, yet being in the same relation to each other. The downward movement of the carriage is limited by a stop projecting above plate E, against which lever F will strike at the end of each descent.

The operation of raising and forcing down the carriage will be continued by the use of the hand-lever F, and after each successive ascent the carriage will be moved longitudinally (with plate E) by the hand-lever to cause the guide $x$ to enter the next of the series of grooves formed in plate L. Thus the operation is continued until the pieces of lumber have been dovetailed and ready to be joined together to form a rectangular dovetail-joint.

The use of the wedge-pointed guide $x$ and grooved plate L with the hand-lever F prevents any mistake in the work, and avoids those accidents to the work and to the machine which sometimes occur when a spring-catch and rack-bar are employed to hold the carriage and govern its descent. By the use of the eccentrically-journaled rolls, the work of attaching and detaching the lumber is performed with greater facility and in a better manner. My improved machine may be readily attached to and detached from an ordinary wood-working machine in which a horizontal rotary tool-shaft can be employed.

Having described my invention, I claim and desire to secure by Letters Patent—

1. The combination of the wedge-pointed guide $x$, connected with the carriage A, and the grooved plate L upon stationary plate G, in the manner and for the purpose specified.

2. The slotted lever F, in combination with the sliding plate E and pin $d$, attached to the carriage in the manner and for the purpose specified.

3. The eccentrically-journaled and sleeved rolls D D', and their adjustable boxes, in combination with the carriage A B C of the dovetailing-machine, as and for the purpose specified.

Witness my hand this 29th day of June, A. D. 1876.

CHARLES STENGEL.

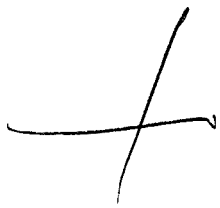

Witnesses:
H. P. K. PECK,
LIBOR STENGEL.